United States Patent [19]

Boshers

[11] 3,818,325

[45] June 18, 1974

[54] BATTERY TESTING DEVICE

[75] Inventor: William A. Boshers, Madison, Ala.

[73] Assignee: The United States of America as represented by the Administrator of the National Aeronautics and Space Administration, Washington, D.C.

[22] Filed: Jan. 24, 1973

[21] Appl. No.: 326,327

[52] U.S. Cl............... 324/29.5, 324/72.5, 136/182
[51] Int. Cl. ........................................ G01n 27/42
[58] Field of Search............. 324/29.5, 72.5, 158 P; 136/182; 320/48; 339/95 B, 95 R, 97 T, 108 TB, 150 B, 151 B

[56] References Cited
UNITED STATES PATENTS

| | | | |
|---|---|---|---|
| 3,559,056 | 1/1971 | Easi | 324/72.5 |
| 3,562,643 | 2/1971 | Smith | 324/72.5 |
| 3,586,962 | 6/1971 | Rebstock | 324/29.5 |

Primary Examiner—Alfred E. Smith
Assistant Examiner—Rolf Hille
Attorney, Agent, or Firm—L. D. Wofford, Jr.; W. H. Riggins; J. R. Manning

[57] ABSTRACT

A battery testing device for testing the cells of a multiple-cell battery, the battery having a cover plate with access holes to provide access to the connecting straps between cells. A panel defines a plurality of probe assembly receiving holes located to correspond to the location of the access holes when the panel is positioned on top of the battery. A probe assembly is positioned within each probe assembly receiving hole, having a spring biased electrically conductive plunger operative to make electrical contact with the connecting strap through the corresponding access hole when the panel is pushed towards the top of the battery. There is a certain play between the probe assembly receiving hole and the probe assembly to permit lateral adjustment of the latter within the probe assembly receiving hole to enable the probe assemblies to be slightly adjusted in position to properly align with their corresponding access holes.

3 Claims, 5 Drawing Figures 3,818,325

BATTERY TESTING DEVICE

ORIGIN OF THE INVENTION

The invention described herein was made by an employee of the United Stated Government and may be manufactured and used by or for the Government for governmental purposes without the payment of any royalties thereon or therefor.

BACKGROUND OF THE INVENTION

1. Field of the Invention

The invention relates to a probe assembly panel for testing the cells of a multi-cell battery.

2. Description of the Prior Art

It is often necessary or desirable to test the cells of a multi-cell battery. To do so on a cell-by-cell basis is time consuming and is therefore not satisfactory, especially if a large number of batteries are to be tested.

The connecting straps between the respective cells of certain special type batteries are accessible only through access holes in the top cover of the battery and probes are inserted into these holes so as to project into the battery and contact the connecting straps between cells. The connecting straps may not be in exactly the same horizontal plane so that the probes need to be vertically adjustable to permit each probe to extend into the battery far enough to contact its corresponding connecting strap. The access holes may also not be perfectly uniform in spacing.

The Haubursin U.S. Pat. No. 2,690,544 relates to a testing apparatus for batteries wherein two portable and adjustable fixtures are connectable to batteries which may have variable spacing of terminal posts and connector straps. One of the fixtures must be mechanically attached to the terminal post of one cell of a three-cell battery, and the other fixture must be mechanically attached to the terminal post of the third cell of the battery. Each fixture comprises a pair of spring loaded vertical plungers to make contact with the appropriate terminals of a cell under test, which are transversely adjustable relative to each other. The structure of the fixtures is relatively complex.

SUMMARY OF THE INVENTION

The instant invention which relates to a battery testing device provides for testing all cells of a multi-cell battery without the necessity of mechanical connections thereto, and which further provides adjustability of testing prongs vertically and laterally to enable simultaneous contact with all of the battery connecting straps.

The battery testing device according to the invention provides a probe assembly panel defining a plurality of probe receiving holes corresponding in number to the number of connecting straps of the battery, and which are positioned to correspond to the connecting strap access holes defined by the battery coverplate. Each probe receiving hole receives a probe assembly having a plunger which is vertically and laterally adjustable with respect to the associated connecting strap to enable simultaneous contact to be made with all of the battery connecting straps. The plungers in turn are electrically connected to an appropriate measuring instrument to provide readings as to the condition of each cell.

DETAILED DESCRIPTION OF THE INVENTION

Figure 1:
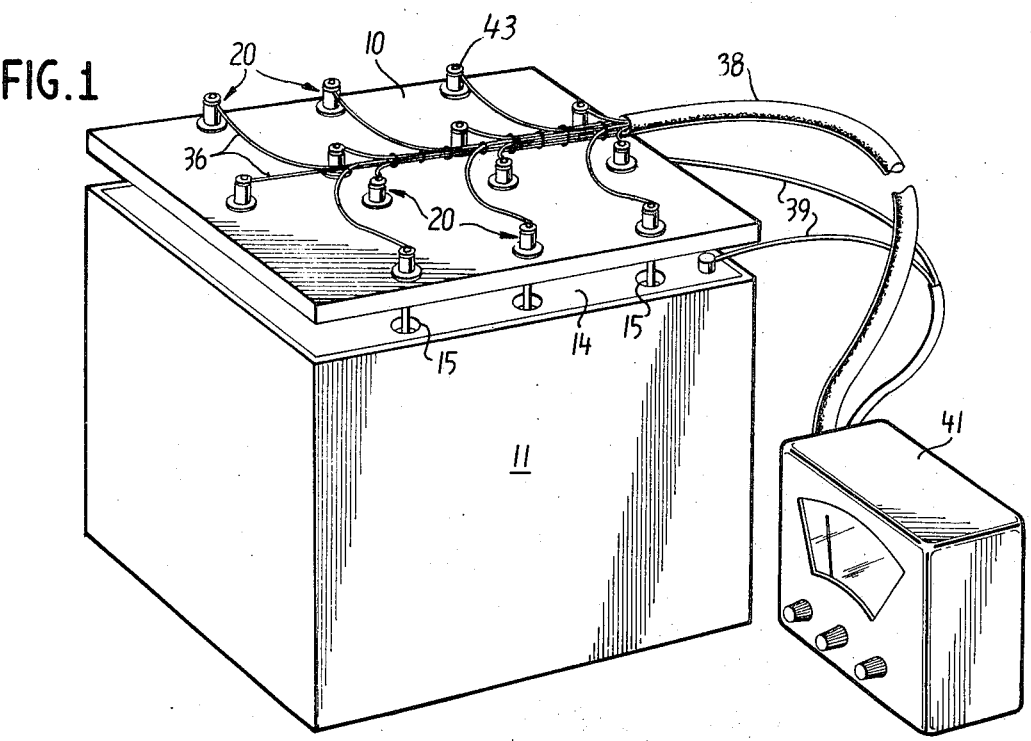
FIG. 1 is an isometric view of a probe assembly panel according to the invention positioned on top of a battery.
Figure 2:
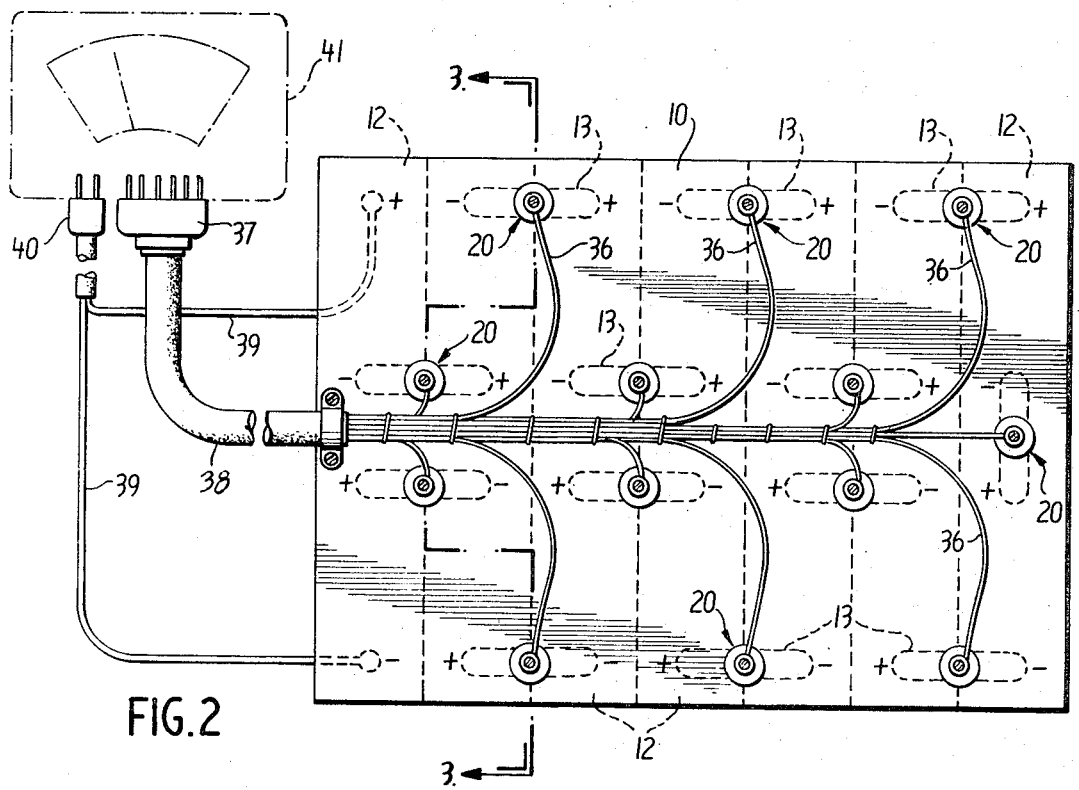
FIG. 2 is a top plan view of the probe assembly panel according to the invention.
Figure 3:
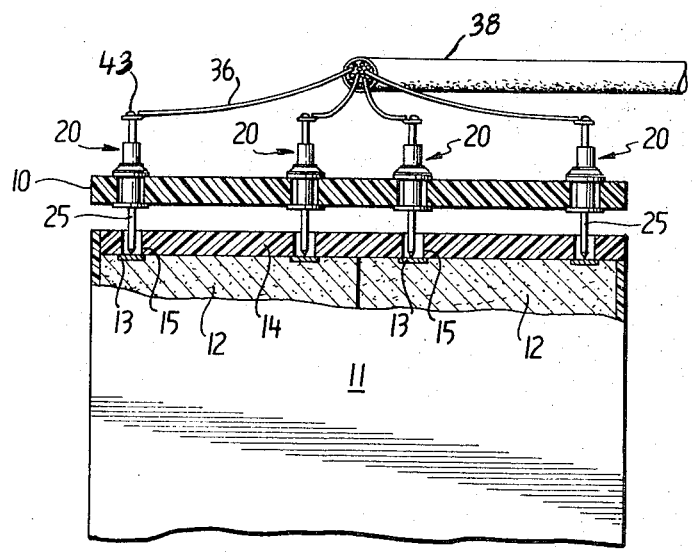
FIG. 3 is a partial side sectional view of the probe assembly panel according to the invention and the battery.

The probe assembly panel 10 positioned on top of a battery for testing the cells thereof is generally shown in FIGS. 1, 2, and 3, which show battery 11 comprising a plurality of cells 12 connected by connecting straps 13, which connect respective positive and negative terminals of adjacent cells 12. With respect to FIG. 2, the individual cells are shown having positive (+) and negative (−) terminals, adjacent cells having connecting straps 13 electrically connecting the oppositely-polarized terminals of adjacent cells in series, as is conventionally known in the art. The cover plate 14 of the battery defines a plurality of access holes 15 corresponding in number to that of the connecting straps 13, to provide external access to the latter.

The probe assembly panel 10 according to the invention is generally shown in FIG. 3, and comprises a transparent insulating material such as plexiglass or the like. The panel 10 defines a plurality of probe receiving holes 16, corresponding in number to the number of connecting straps 13. Each probe receiving hole 16 is positioned on panel 10 to correspond to access holes 15 defined by the cover plate of the battery, above its respective connecting strap 13 within the battery.

Figure 4:
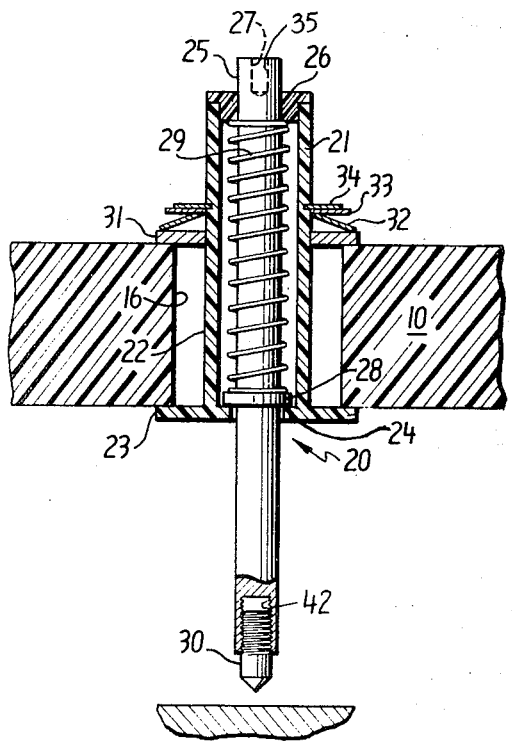
FIG. 4 is a detailed view of an individual probe assembly according to the invention.

Each probe receiving hole 16 receives a probe assembly 20, which is shown in greater detail in FIG. 4. Sleeve 21, which comprises an insulating material, is fitted into the probe receiving hole 16, there being a given amount of play 22 between the outside wall of sleeve 21 and the interior wall of probe hole 16. Sleeve 21 defines an integral flanged section 23 contacting the bottom portion of the panel 10 immediately surrounding probe receiving hole 16, and a lip portion 24. A vertically reciprocal spring urged plunger 25 is fitted to extend within sleeve 21. As shown in FIG 4, the top portion of sleeve 21 is fitted with cap 26, which comprises an insulating material, and which defines a central aperture through which end 27 of plunger 25 extends. A collar 28 is attached to plunger 25, with one end of spring 29 bearing on collar 28 and the other end bearing on cap 26. Spring 29 normally maintains collar 28 in position on lip 24, but is operable to permit vertical movement of plunger 25 as explained hereafter. The lower end of plunger 25 defines an internal bore 42 in threaded engagement with extensio 30, which may thus be threaded in and out to further adjust the overall length of the plunger.

The probe assemblies are securely mounted to their respective probe receiving holes 16 by a washer 31 surrounding sleeve 21 that bears on the top of probe panel 10 as a result of the urging of spring disc 32 which is held in place by washer 33 and retainer ring 34, the latter being secured to sleeve 21.

The top of each plunger 25 defines a threaded hole 35 for receiving a clamp screw 43 which connects wire 36 from the conductive plunger to an end plug 37. The wires 36 are interlaced in a bundle 38. End plug 37 is connected to an appropriate instrument 41 such as voltmeter or ammeter to automatically connect the instrument across successive cells to indicate the condition thereof. Power leads 39 are connected between the end terminals of the battery and a plug 40, and the latter may be inserted into the instrument for checking the overall battery condition.

Figure 5:
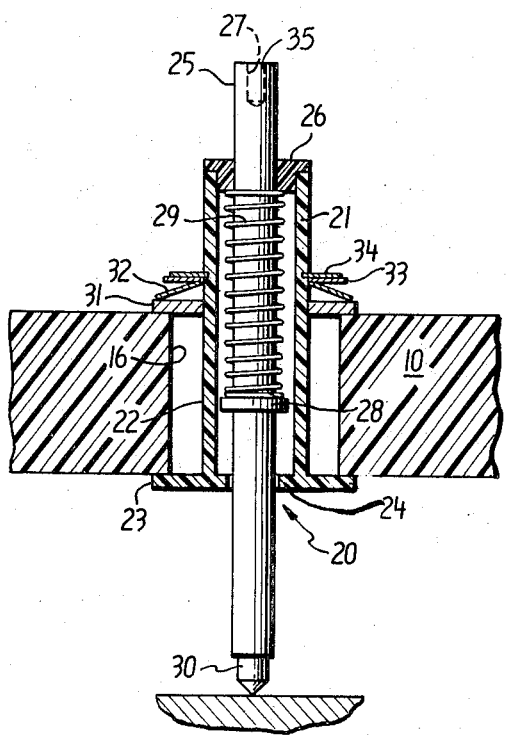
FIG. 5 is similar to FIG. 4, but shows the position of the plunger under certain conditions.

In operating the probe assembly, panel 10 is positioned over the battery as shown in FIG. 3. The respective plungers 25 make contact with their respective connecting straps for testing the cells by pressing down on panel 10. The action of springs 29 results in a tight connection between the ends of the plungers 25 and their respective connecting straps 13 as shown in FIG. 5, whereby the condition of the cells may be tested. The springs 29 are biased to return the plungers to their normal position (FIG. 3) when the panel is released from the battery. As explained heretofore, extension 30 may be used to adjust the overall length of an individual plunger if required to insure a tight electrical connection with the associated connector strap. The play in the probe receiving hole 16 permits a slight degree of lateral adjustment of the probe assembly 20, in order that it may be adjusted in position to align with the corresponding access hole 15. Different panels may be designed to accommodate various types of batteries.

I claim:

1. A battery testing device for testing the cells of a multiple-cell battery, the battery having a cover plate with access holes to provide access to the connecting straps between cells, comprising:

a panel of electrical insulating material defining a plurality of probe assembly receiving holes located to correspond to the location of the access holes when the panel is positioned on top of the battery;

a probe assembly positioned within each probe assembly receiving hole of said panel, each of said probe assemblies comprising a sleeve of electrical insulating material extending through said receiving hole and containing a spring-biased electrically conductive plunger operative to make electrical contact with the connecting strap through the corresponding access hole when the panel is pushed toward the top of the battery;

the diameter of said sleeve being substantially less than the diameter of said assembly receiving hole whereby said sleeve may shift laterally within said hole to enable the probe assembly to be laterally adjusted to properly align with the corresponding hole;

means for maintaining firm support for said sleeve while permitting lateral adjustment thereof, said means comprising a washer and a disc spring encompassing said sleeve with said washer being urged toward said panel by said spring;

said plunger having a threaded adjustable extension at the end thereof which contacts the corresponding connecting strap to vary the length of plunger to ensure a firm electrical contact with said strap;

connection means at the end of the plunger opposite said adjustable extension for connecting said plunger to an electrical instrument for testing the electrical characteristics of the cells.

2. The invention as recited in claim 1 wherein said sleeve has an integral lip thereon on the end remote from said washer, said lip bearing on the side of said panel opposite said washer.

3. The invention as defined in claim 1 wherein an electrical conducting wire is connected to said connecting means of said plunger of each of said probe assemblies, said wires being mechanically interlaced and connected to a common first end plug for connection to said electrical instrument.

* * * * *